Figure 1:
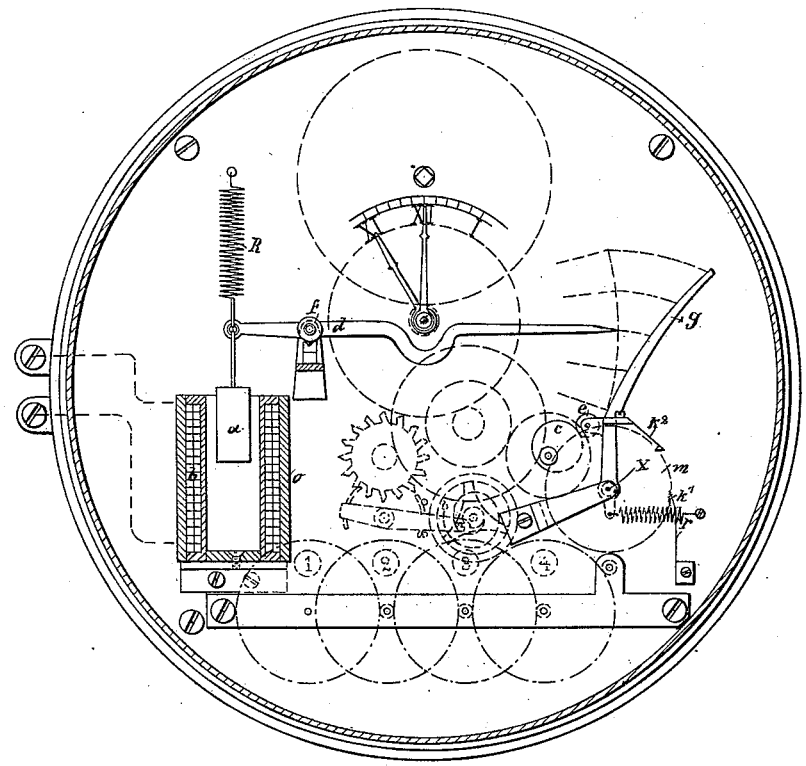

(No Model.) 2 Sheets—Sheet 1.

E. W. VON SIEMENS.
ELECTRIC METER.

No. 428,290. Patented May 20, 1890.

Witnesses:
W. Allen
H. S. Knight

Inventor
E. W. von Siemens
by Herbert W. T. Jenner
Attorney (No Model.) 2 Sheets—Sheet 2.
E. W. VON SIEMENS.
ELECTRIC METER.
No. 428,290. Patented May 20, 1890.
Fig. 5.
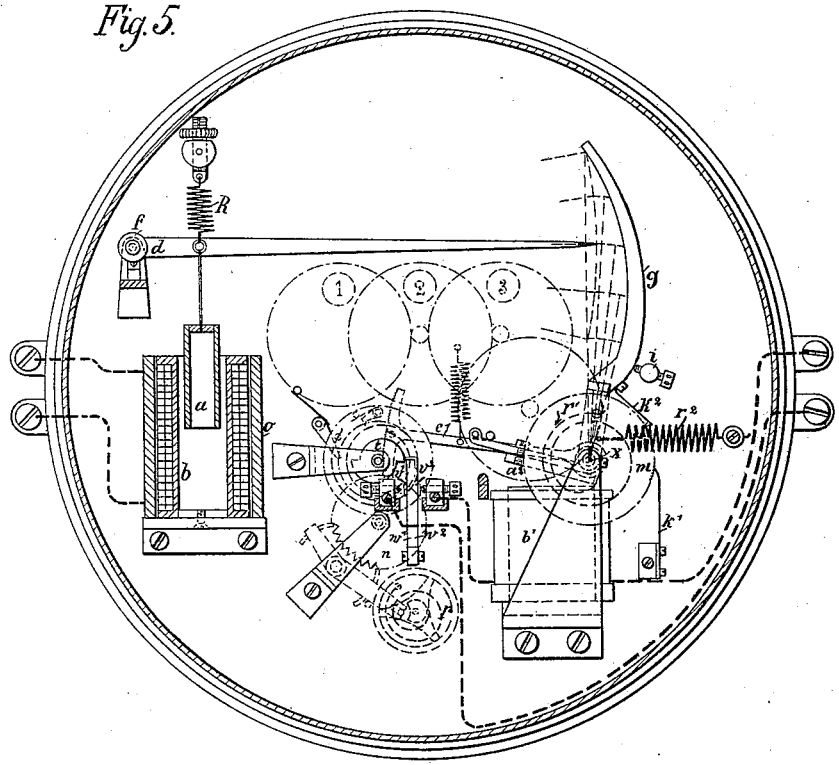
Fig. 5.ª
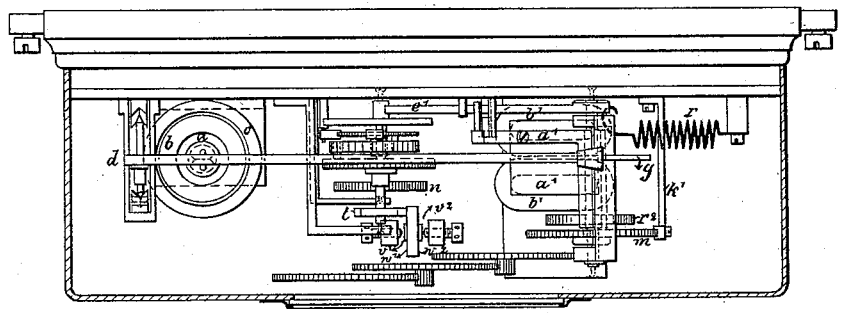
Fig. 6.
Witnesses:
W. Allen
H. S. Knight
Inventor
E. W. von Siemens.
by Herbert W. T. Jenner
Attorney.

UNITED STATES PATENT OFFICE.

ERNST WERNER VON SIEMENS, OF BERLIN, GERMANY.

ELECTRIC METER.

SPECIFICATION forming part of Letters Patent No. 428,290, dated May 20, 1890.

Application filed December 9, 1889. Serial No. 333,047. (No model.) Patented in Germany February 7, 1889, No. 50,623; in England July 15, 1889, No. 11,419; in Switzerland July 20, 1889, No. 1,404; in Belgium July 24, 1889, No. 87,123; in France July 24, 1889, No. 199,783, and in Italy September 19, 1889, XXIII, 25,984, LI, 152.

*To all whom it may concern:*

Be it known that I, ERNST WERNER VON SIEMENS, doctor of philosophy, a resident of the city of Berlin, in the Kingdom of Prussia and German Empire, and a subject of the King of Prussia and German Emperor, have invented certain new and useful Improvements in Electric Meters, (for which I have obtained patents in Belgium, No. 87,123, dated July 24, 1889; in Italy, Reg. Gen., Vol. XXIII, 25,984, and Reg. Att., Vol. LI, 152, dated September 19, 1889; in Switzerland, No. 1,404, dated July 20, 1889, and in Great Britain, No. 11,419, dated July 15, 1889; also in Germany, No. 50,623, dated February 7, 1889, and in France, No. 199,783, dated July 24, 1889;) and I do hereby declare the following to be a full, clear, and exact description of the invention, such as will enable others skilled in the art to which it appertains to make and use the same.

My invention relates to an improved construction of electric meters, more particularly intended for measuring electrical energy, based on the method which consists in the continuous measurement, at successive regular intervals of time, of the product of the strength and potential of a current passing through a conductor, and to totalize the same by means of a counter or registering mechanism, under the assumption that the indications obtained from the counter will correspond without material error to the actual consumption of electrical energy.

The present improved method for the construction of such apparatus differs from that above alluded to essentially in that the current to be measured has to perform no other work than the movement of a light pointer, so that the consumption of energy by the apparatus itself is exceedingly small, and consequently that the currents to be measured by the apparatus can differ to a very great extent. Whether the apparatus measures the consumed energy or the sum of the consumed strengths of current—that is to say, the consumed quantity of electricity—only depends upon whether the position of the pointer is made to depend upon the product of potential and strength of current or upon the strength of current alone. As with central stations the potential is always maintained constant, and it is only for these that such registering apparatus are required, the following description of the apparatus will only deal with the measurement of the quantity of current.

Figure 2:
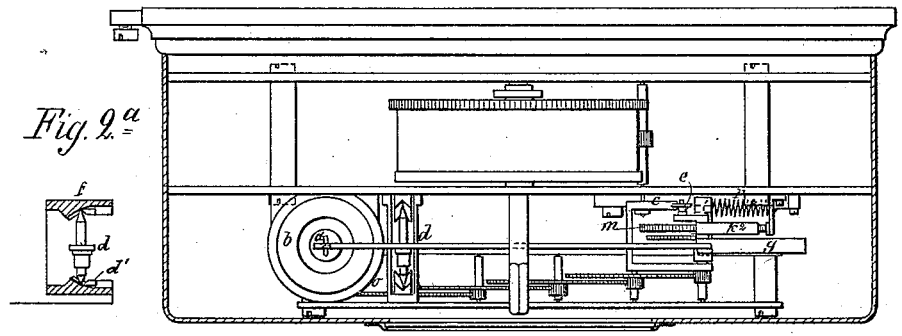
Figures 3, 4:
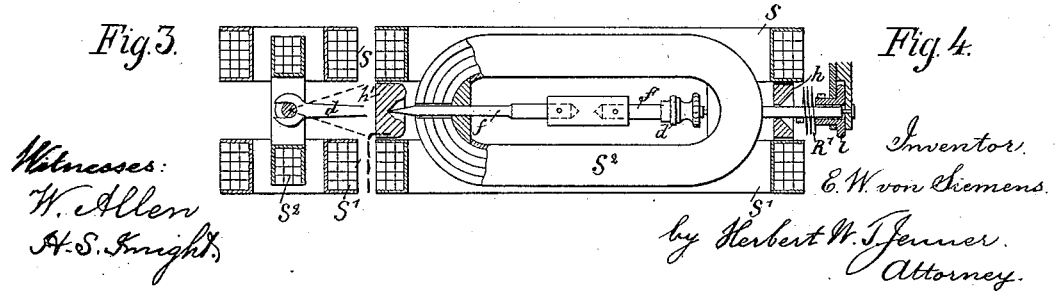

In the accompanying drawings two modifications of the apparatus forming the object of my present invention have been represented. In these drawings, Figure 1 is a front elevation with partial cross-section, and Fig. 2 a plan view with partial cross-section, of an apparatus of the first kind, while Fig. 2ᵃ illustrates a detail of this apparatus. Figs. 3 and 4 represent a vertical cross-section and a longitudinal cross-section with partial side view of a partial modification of this apparatus. Fig. 5 is a front elevation with partial cross-section, and Fig. 6 a plan view with partial cross-section, illustrating another modification of the whole apparatus, while Fig. 5ᵃ shows a detail of the same.

The apparatus consists, essentially, of a light arm or lever $g$, having a suitably-curved face, which is caused by clock-work to be turned on its axis at regular intervals of time from a stated rest until it meets the end or edge of a pointer $d$, the position of which is determined by the strength of the current, such angular motion of the arm $g$ being transmitted to the wheel-work of a counter or registering mechanism. Thus, the position of the pointer $d$ being dependent upon the strength of the current to be measured, and the curved face of the rocking arm $g$, which is brought in contact therewith, being so formed that the extent of the arc which it passes through until it meets the pointer $d$ is proportionate to the strengths of current which determines the position of the pointer $d$, then the counter will totalize all the several strengths of current which existed at the times of measurement, and will thus measure the quantity of electricity that has passed through the circuit, under the assumption that the separate measurements may each be taken as indicating the mean strength of current passing during the interval between two measurements, which with continuous working will be the case with sufficient accuracy if the intervals between measurement are sufficiently small.

The two modes of constructing the apparatus as they have been illustrated by the Sheets I and II differ only by that in the apparatus illustrated by the Sheet I. The movement of the measuring-arm $g$ is effected by means of an eccentric or cam-shaped disk, which receives continuous regular rotary motion by clock-work mechanism wound up by hand, while in the apparatus illustrated by the Sheet II the movement of the measuring-arm $g$ is effected by an electro-magnet, through the coils of which flows a short current at stated rates by means of a self-acting interrupter.

In the apparatus illustrated by Sheet I the pointer $d$ is journaled at $f$ and connected to a magnetic core $a$, situated inside a solenoid $b$, through which the current to be measured passes, which core $a$ is suspended from an adjustable spring R, so that according as the strength of current increases or decreases the core $a$, in being drawn more or less into the solenoid $b$ against the action of the spring R, will bring the edge of the pointer $d$ into correspondingly-varying positions. When by the weakening of the current the magnetic core is drawn upward by the spring R so as to bring the pointer $d$ into such close proximity to a point of the arm $g$ near its axis that this is thereby prevented from advancing at all, this position corresponds to the zero position of the parts, in which the current passing is so weak as not to be measured. When, on the other hand, the strength of the current increases to such an extent that the core in descending brings the pointer $d$ into the opposite extreme position, it will come in contact with a point near the extreme end of the arm $g$. When this moves forward the apparatus will then measure the maximum strength of current capable of being indicated thereby.

The intermediate points of the curved face of the arm $g$ are determined empirically, so as to cause the corresponding movements of the arm $g$, when it comes in contact with the pointer $d$ at one or other of these points, to be always in proportion to the strength of the current. This being so, it will not signify whether the movements of the pointer $d$ are always proportional to the strength of current or not, as, should from any cause—such as variation in the magnetism of the core $a$—the positions of the pointer vary in respect to a certain strength of current, it will only be necessary to adjust the position of the core $a$ and pointer $d$ by means of the before-mentioned regulating-spring R, so that the pointer $d$ allows of the correct amount of movement of the arm for a certain strength of current in a certain position for it to operate correctly in every other position. The motion of the arm $g$ may be transmitted by a ratchet-wheel $m$, turning loose on the axis $x$ of the arm $g$, and by a pinion and a toothed wheel to the counter.

The arm $g$ is provided with a feathering pawl $k^2$, turning the ratchet-wheel $m$ at an angle proportional to the movement of the arm $g$. The return movement of the wheel is obviated by a second feathering pawl $k'$. The arm $g$ itself is acted upon by a spiral spring $r$, or by a weight, so as to bear with a roller $e$ upon the eccentric or cam $c$, so that as this rotates, driven by the clock-work, it allows the arm $g$ to advance toward the pointer until its motion is arrested by the latter, the arm being held in this position until the eccentric by its further rotation moves the arm $g$ back to its original position.

For reducing the friction of the pointer-axis as much as possible it is mounted with pointed ends in hard-steel curved grooves of greater angle than the angle of the pointed ends, so that the contact only takes place at the points. (See Fig. $2^a$, Sheet I.)

In order to insure the correct position of the axis ends in these grooves, beveled filling-pieces $d'$ are inserted in the latter over the points after these have been introduced and are secured therein.

For obviating the necessity of frequently winding up the clock-work mechanism and of employing powerful clock-work the following modified construction of the apparatus is employed, which has been illustrated by Figs. 5, $5^a$, and 6 of the second sheet.

Instead of connecting the pointer $d$ to the magnetic core $a$ in such manner that the former is in its position nearest the axis of the rocking arm $g$ when the core $a$ is withdrawn from the solenoid $b$ by the spring R— that is to say, when the current is weakest— the reverse arrangement is adopted, this arrangement having the advantage that very weak currents can be more accurately registered. In this case the arm $g$ is drawn back by the spring $r^2$ against a fixed stop $i$, which is so regulated that when no current is passing the pointer $d$, being in its highest position, is opposite and in close proximity to the extreme division on the outer end of the arm $g$, the curvature of which is in this case convex relatively to the pointer. The forward motion of the arm $g$ toward the pointer is in this case effected by means of a small fixed electro-magnet or solenoid $a'$, with fine-wire coils $b'$, which when excited attracts an armature or core $a^2$, pivoted loose on the axis $x$ of the arm $g$, but connected to the arm by a spiral spring $r'$, which is slightly stronger than the first-named spring $r^2$, that draws the arm $g$ back against the stop $i$, so that when the armature $a^2$ is attracted by the electro-magnet $a'$ $b'$ the arm $g$ is drawn by the spiral spring $r'$ gently toward the pointer $d$, and is held there as long as the electro-magnet $a'$ $b'$ is excited, after which the arm $g$ is drawn back by the other spring $r^2$. The coils $b'$ of the electro-magnet $a'$ $b'$ are in a shunt-circuit of high resistance to the main circuit, so that when the shunt-circuit is closed the electro-magnet $a'$ $b'$ is always excited in a very uniform manner.

The closing of the shunt-circuit may be effected in any known manner by which a current of short duration is established at regular intervals of time. In the apparatus shown by the Sheet I, this is effected by means of a clock-work mechanism consisting of an anchor-escapement, being provided with a balance $p$ and a balance-wheel $n$, and which is driven by a light spring and toothed gear, the spring being wound up at each forward motion of the rocking arm $g$ by means of a toothed sector $e'$, carried by the same, acting by means of a ratchet-and-pawl arrangement connected to the spring on an interrupter, being illustrated separately by Fig. $5^a$ of the Sheet II. This interrupter consists of a cam $t$, fastened to the axis of the spring-box, being provided with two drops $n'$ $n^2$, which act upon two contact-springs $w'$ $w^2$ in such a manner that their ends rest upon these drops $n'$ and $n^2$ till one of them has passed over, at which moment the spring leaves the drop suddenly. The two springs $w'$ $w^2$ are in conducting connection. Therefore the conducting connection of the two contact-screws $v'$ $v^2$ is established if both springs $w'$ $w^2$ are touching their respective contact-screws; but this occurs only during that time while one of the springs—that is to say, $w'$—has suddenly left the drop, but the other has not yet passed over this drop, and is therefore pressed against the contact $v^2$. This arrangement has the advantage that the conducting connection is made suddenly, and therefore the circuit is closed suddenly and is interrupted in the same manner.

The electro-magnet or solenoid $b$ can be inclosed in an iron casing $o$, to prevent it from being influenced by the approach of other magnets.

If the above-described apparatus is to be employed for measuring the electrical energy of circuits in which the potential is subject to considerable variations, there may be used in place of the magnetic or soft-iron core connected to the pointer a solenoid of fine wire, which may enter the fixed solenoid in the same way as the core, but which is preferably arranged as follows, as represented by the Sheet I—namely, by Fig. 3 in a plan view and by Fig. 4 in a vertical cross-section. In this arrangement the movable solenoid $S^2$ is fixed on the spindle $f$ of the pointer $d$, which is arranged in the middle thereof and projects at right angles to its plane. This solenoid is made of oblong form and is situated within the loops of two fixed solenoids S S', placed with their planes at right angles thereto, the spindle $f$ carrying the movable solenoid $S^2$ and pointer $d$ being made to conduct the current to the solenoid $S^2$. This may be effected in various ways. According to the arrangement illustrated by the accompanying drawings, the one end of the spindle $f$ is carried in a mercury-cup $h'$, in which the one lead from the circuit dips, while the other end of the spindle passes through a cup $h$ of glass, pebble, or other non-amalgamatable material, which is also filled with mercury, and into which dips the other lead. The hole of the cup through which the spindle passes fits the spindle so nearly that the mercury cannot leak through on account of the capillary repulsion.

The pointer $d$ and solenoid $S^2$ are adjusted in their zero position by means of a spiral spring R', one end of which is attached to the spindle $f$, while the other end is attached to an adjusting-screw $l$, the torsional force of the spring being such as to allow the pointer to pass to the other extreme position when measuring a current of maximum force.

The curved face of the rocking arm $g$ is so formed that the angular movements which the arm performs in advancing toward the pointer are proportional to the product of potential and strength of current.

Having now particularly described and ascertained the nature of my invention and in what manner the same is to be performed, I desire it to be understood that what I claim is—

1. In an electric meter, the combination, with the pointer and the pointer-spindle having a pointed end, of the mercury-cups $h$ and $h'$, for supporting said spindle and conveying the current, a movable coil of fine wire secured on said spindle, the stationary coils encircling said movable coil, and an adjustable spring for setting the said movable coils and pointer, substantially as and for the purpose set forth.

2. In an electric meter, the combination, with a current-indicator provided with a light pointer, of a motor provided with a continuously-revolving eccentric, registering mechanism, a pivoted arm operated by said eccentric in one direction, and a spring for moving said arm in the reverse direction, said arm being adapted to have the amplitude of its vibrations curtailed by the said current-indicating pointer and to transmit the extent of its said vibrations to the said registering mechanism, substantially as and for the purpose set forth.

3. In an electric meter, the combination, with a current-indicator provided with a light pointer, of a motor provided with a continuously-revolving eccentric, a pivoted arm vibrated in one direction by said eccentric, and provided with a convexly-curved face adapted to contact with said pointer, and thereby to limit the extent of the vibrations of the arm in proportion to the product of the potential and the strength of the current, a spring for moving the said arm in the reverse direction, and registering mechanism operatively connected to said arm and adapted to register the sum of its varying vibrations, substantially as and for the purpose set forth.

In testimony whereof I affix my signature in the presence of two witnesses.

ERNST WERNER VON SIEMENS.

Witnesses:
  TH. STUDEMANN,
  MAX WAGNER.